United States Patent [19]

Klocke et al.

[11] Patent Number: 5,560,710
[45] Date of Patent: Oct. 1, 1996

[54] PROCESS FOR MIXING GAS JETS OR STREAMS

[75] Inventors: Bernhard Klocke, Bochum; Horst Simon, Essen-Kettwig, both of Germany

[73] Assignees: Thyssengas GmbH, Duisburg-Hamborn; Gaswärme Institut e.V., Essen, both of Germany

[21] Appl. No.: 887,237

[22] Filed: May 18, 1992

Related U.S. Application Data

[63] Continuation of Ser. No. 446,374, Dec. 5, 1989, abandoned.

[30] Foreign Application Priority Data

Dec. 23, 1988 [DE] Germany .................... 38 43 543.8

[51] Int. Cl.$^6$ ...................................... B01F 5/04
[52] U.S. Cl. .................. 366/336; 366/348; 366/337; 431/10; 431/9
[58] Field of Search .............. 237/8, 543; 366/336, 366/101, 337, 348; 431/10, 185, 9, 115, 116; 423/235, 239; 110/345; 208/120

[56] References Cited

U.S. PATENT DOCUMENTS

| | | | |
|---|---|---|---|
| 1,587,263 | 6/1926 | Willners | 239/8 X |
| 1,740,471 | 12/1929 | McBride | 239/8 |
| 2,532,554 | 12/1950 | Joeck | 239/8 X |
| 3,044,711 | 7/1962 | Douglas et al. | 239/8 X |
| 3,260,461 | 7/1966 | Biber et al. | 239/8 |
| 3,406,906 | 10/1968 | Backman et al. | 239/101 |
| 3,409,274 | 11/1968 | Lawton . | |
| 3,604,824 | 9/1971 | Hardison | 431/116 |
| 3,868,211 | 2/1975 | Haye et al. | 431/10 |
| 3,908,371 | 9/1975 | Nagai et al. | 60/301 |
| 3,957,418 | 5/1976 | Sata | 431/9 |
| 4,138,986 | 2/1979 | Combs et al. | 431/185 X |
| 4,335,084 | 6/1982 | Brogan | 423/235 |
| 4,336,469 | 6/1982 | Wysk | 310/11 |
| 4,425,159 | 1/1984 | Nixon | 431/9 X |
| 4,473,185 | 9/1984 | Peterson et al. | 239/8 |
| 4,516,510 | 5/1985 | Basic, Sr. | 110/345 X |
| 4,699,071 | 10/1987 | Vier et al. . | |
| 4,744,967 | 5/1988 | Brand et al. | 423/235 X |
| 4,782,770 | 11/1988 | Carlson . | |
| 4,789,531 | 12/1988 | Eichholtz | 423/235 |
| 4,812,431 | 3/1987 | Child | 208/120 X |
| 4,828,680 | 5/1987 | Green et al. | 208/120 |
| 4,878,442 | 11/1989 | Yeh et al. | 110/345 |
| 4,884,746 | 12/1989 | Lewis | 239/8 |
| 4,911,956 | 3/1990 | Gabryszewski et al. | 239/101 X |
| 4,938,685 | 7/1990 | Noakes et al. | 431/9 |
| 5,118,282 | 6/1992 | Reynolds | 110/345 |
| 5,138,958 | 8/1992 | Sinquin et al. | 110/345 |
| 5,171,552 | 12/1992 | Miura et al. | 110/345 |
| 5,186,901 | 2/1993 | Bayer et al. | 110/345 |

FOREIGN PATENT DOCUMENTS

| | | |
|---|---|---|
| 682718 | 12/1966 | Belgium . |
| 1373007 | 8/1964 | France . |
| 2222124 | 10/1974 | France . |
| 2260265 | 8/1975 | France . |
| 2031016 | 1/1971 | Germany . |
| 7116127 | 3/1973 | Netherlands . |

*Primary Examiner*—Frankie L. Stinson
*Attorney, Agent, or Firm*—Anderson Kill Olick & Oshinsky, P.C.

[57] ABSTRACT

In a process for continuously mixing streams of at least two fluid media, in particular for use in reburning or progressive combustion and for secondary $NO_x$-reduction in flue gases from industrial furnace plants an auxiliary gas stream is injected into a main gas stream by means of swirl-momentum nozzles which impart a characteristic axial impulse and an angular impulse to the fluid.

19 Claims, 5 Drawing Sheets

PROCESS FOR MIXING GAS JETS OR STREAMS

This is a continuation application of Ser. No. 07/446,374, filed Dec. 5, 1989 now abandoned.

TECHNICAL FIELD OF THE INVENTION

The invention relates to a process for continuously mixing jets or streams of at least two fluid media wherein an auxiliary gas stream is injected into a main gas stream.

BACKGROUND OF THE INVENTION AND PRIOR ART

The speed and completeness of chemical reactions depend to a large extent on whether and how far it is possible to mix the reaction partners with one another. Optimal reaction conditions arise if the reaction partners form a homogeneous mixture, so that the diffusion paths are as short as possible. This ideal condition can usually not be obtained at tolerable expense in pipe lines, and particularly in flue gas passages from large boilers, with a cross-section of several $m^2$, for example 3 $m^2$ to 50 $m^2$, in which an auxiliary stream is supplied to a main stream at right angles to the direction of flow so that it normally penetrates to the centre of the main stream. Known solutions are pipe registers installed in the flow or injection nozzles installed in the walls, but all of these lead to a concentration profile across the pipe cross-section, with a concentration peak in the centre of the pipe, which is more or less pronounced depending on the injection conditions.

Relatively good mixing can be obtained with the aid of injectors where one mixing partner is injected through a central nozzle and the other through the annular gap between the central nozzle and the pipe surrounding the nozzle concentrically. A disadvantage of the use of such injectors is however that they require corresponding internal fittings in the region of the mixing path, which leads to difficulties, especially with hot and/or corrosive and dust-containing gases, and is associated with a considerable pressure loss. This, for example, is the case with flue gases from industrial furnaces, whose temperatures lie between 800° to 1200° C. and which contain corrosive components such as sulphur, fluorine and chlorine, and in solid fuel furnaces, for example coal dust furnaces, whose flue gases are loaded with substantial amounts of dust. However, it is precisely these pollutant-containing gases for which subsequent treatment to remove the pollutants is imperative.

Thus, in view of the legal requirements, the flue gases from stationary industrial furnace plants as a rule require secondary measures for removing the nitrogen oxides contained in the flue gases to be employed even if primary measures are employed to reduce the amount of nitrogen oxides formed. A number of wet processes, namely oxidation or reduction-absorption processes or oxidation/reduction processes, and also dry processes for catalytic or non-catalytic reduction of the nitrogen oxides, are known for this purpose. The wet processes and the catalytic processes are however very troublesome and costly as a result of the solid addition materials or catalysts required to remove the nitrogen oxides. This does not apply to the so-called progressive combustion process, in which the fuel supply is divided between at least two combustion stages, followed by a burn-out stage. The technical application of this process therefore involves at least three stages, of which the first stage should be operated super-stoichiometrically, i.e. with an excess of air, the second stage sub-stoichiometrically, i.e. with a deficiency of air, and the third stage again super-stoichiometrically. The second fuel-rich stage can be considered as an NO-reduction stage in which the resulting carbon monoxide reacts with the nitric oxide to form the harmless products carbon dioxide and nitrogen.

The degree of non-catalytic reduction of the nitrogen oxides with the aid of a fluid reducing agent depends in all processes essentially on how far and how quickly the reducing agent can be mixed homogeneously with the usually quickly-flowing flue gases in a zone that is as short as possible, without too much outlay on apparatus and/or too high operating costs.

OBJECT OF THE INVENTION

On this basis it is an object of the invention to provide a mixing process which allows intensive mixing of two gas streams, in particular of a flue gas stream with a smaller reducing gas stream, with little outlay in apparatus and a short mixing path.

SUMMARY OF THE INVENTION

This object is achieved according to the invention with a process of the kind mentioned in the introduction in which a momentum is applied to the auxiliary gas stream, for example the reducing gas or the reducing gas mixture, injected into the main gas stream. With regard to mixing the reaction partners as intensively as possible, it is particularly effective to provide the auxiliary gas stream or streams with an angular momentum which may be such that the theoretical angular momentum, the ratio of the swirl-momentum flow to the axial momentum flow, normalised with the nozzle radius, amounts to from 0.4 to 5 times the critical swirl-number for example once to twice. The injection of the momentum stream at an angle of 10° to 80°, for example 15 ° to 30° counter to the main stream acts in the same way.

Particularly if such a counter-current injection is performed using swirl nozzles the concentricity of the reducing agent in the main stream is broken down, leading to a substantially homogeneous distribution of the reaction partners.

The auxiliary gas stream can also be injected into the main stream as several sub-streams flowing in different directions, including opposed directions, for example in several planes extending at right angles to the axis of the main stream and in directions at angles to one another.

The process according to the invention is therefore particularly suitable for the reduction of nitrogen, oxides contained in flue gases with the aid of fluid reducing agents, for example hydrocarbons. Since the amount of reducing agent necessary for the conversion of the nitrogen oxides is relatively small, and therefore an injection of the pure reducing agent with a correspondingly small impulse is not effective, the reducing agent is injected into the flue gas stream with a suitable amount of flue gas which can be taken from further along in the same process, preferably as a mixture. This has the advantage that only minor additional costs are involved and no secondary products are formed since the flue gas—possibly already freed from nitrogen oxides—forming part of the momentum stream is a pure mass flow with a predominantly physical effect.

The momentum stream can be pre-heated to increase the rate of reaction. In the case of separate injection of the sub-streams of auxiliary gas, for example by means of a pre-mixing nozzle in which the returned flue gas and the hydrocarbon are pre-mixed before being injected into the main gas stream, the mass flow, the discharge momentum and the mixing ratio should be selected relative to the corresponding values of the main gas stream.

A mass ratio (main gas flow to auxiliary gas flow per nozzle) of from 20 to 120, for example 60 to 90; an impulse stream ratio (main gas flow to auxiliary gas flow) of from 1 to 10, for example 3 to 6; a mixture ratio (hydrocarbon to flue gas) of from 1:5 to 1 :40, for example from 1:10 to 1:20; and, when injecting a hydrocarbon, for example natural gas, a main stream temperature of from 700° C. to 1200° C., for example from 1000° C. to 1100° C., have proved to be particularly advantageous. Depending on the reagent the main stream temperature can, however, be considerably lower, e.g. down to 300° C. The auxiliary gas temperature may for example be from 100° C. to 400° C.

Nozzles suitable for the process according to the invention are in particular those in which an angular momentum is imparted at least to the greater mass flow. This can be done by fitting swirl plates (like an axial vane grid), by the use of a radial vane grid, or by introducing gas through tangential passages. When swirl plates are fitted, the vanes should be at an angle of from 10° to 80° C., for example 30° to 45° C., to the axis of the pipe.

The nozzles should be distributed round the periphery of the flue gas passage and can be fitted in different planes extending at right angles to the axis of the passage, possibly also at least some of them with different angles of inclination.

BRIEF DESCRIPTION OF THE DRAWINGS

The invention will now be explained in more detail with reference to exemplary embodiments shown in the drawings, in which.

DETAILED DESCRIPTION OF PREFERRED EMBODIMENTS OF THE INVENTION

Figure 1:
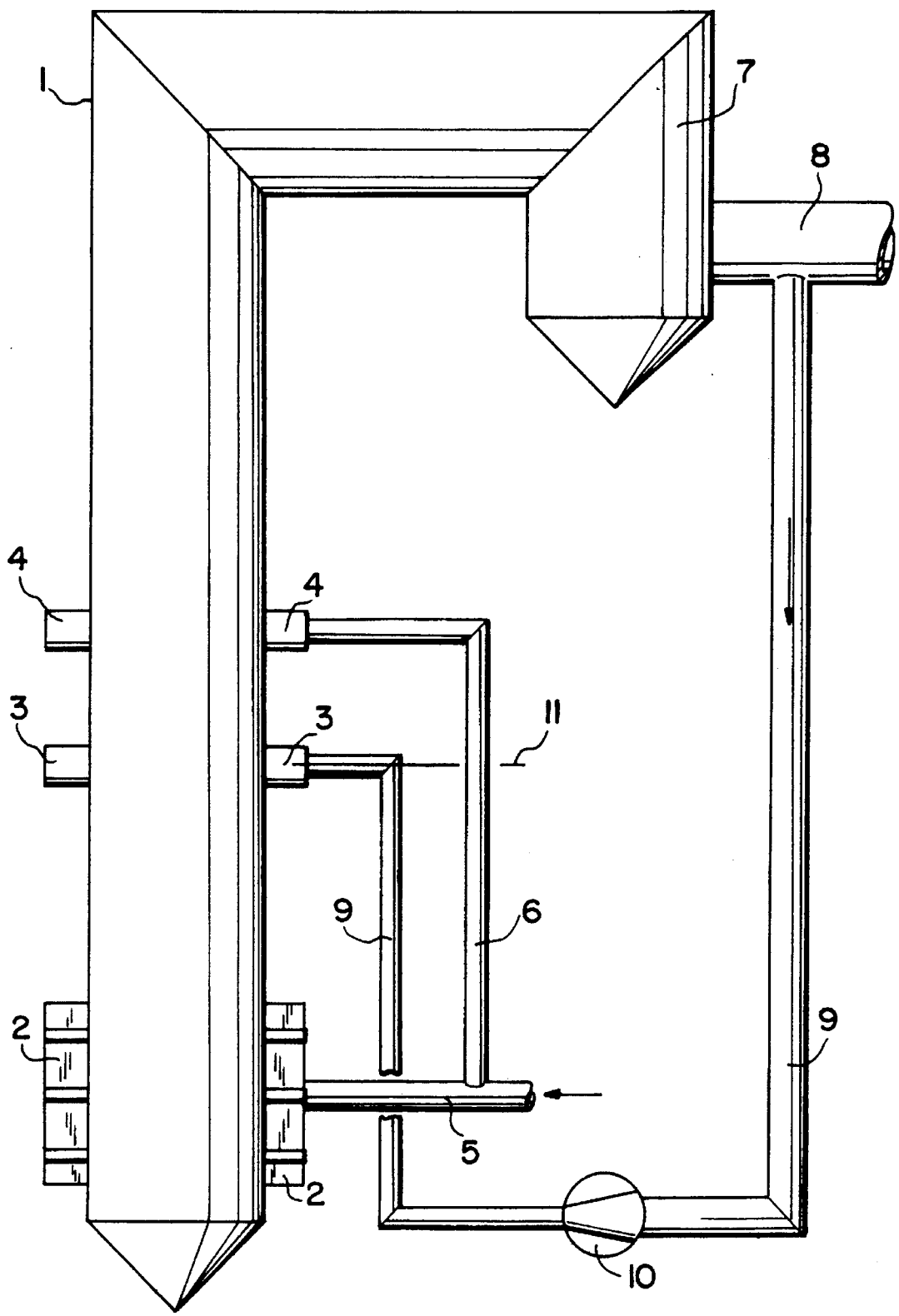
FIG. 1 shows a boiler with progressive combustion.
Figure 2:
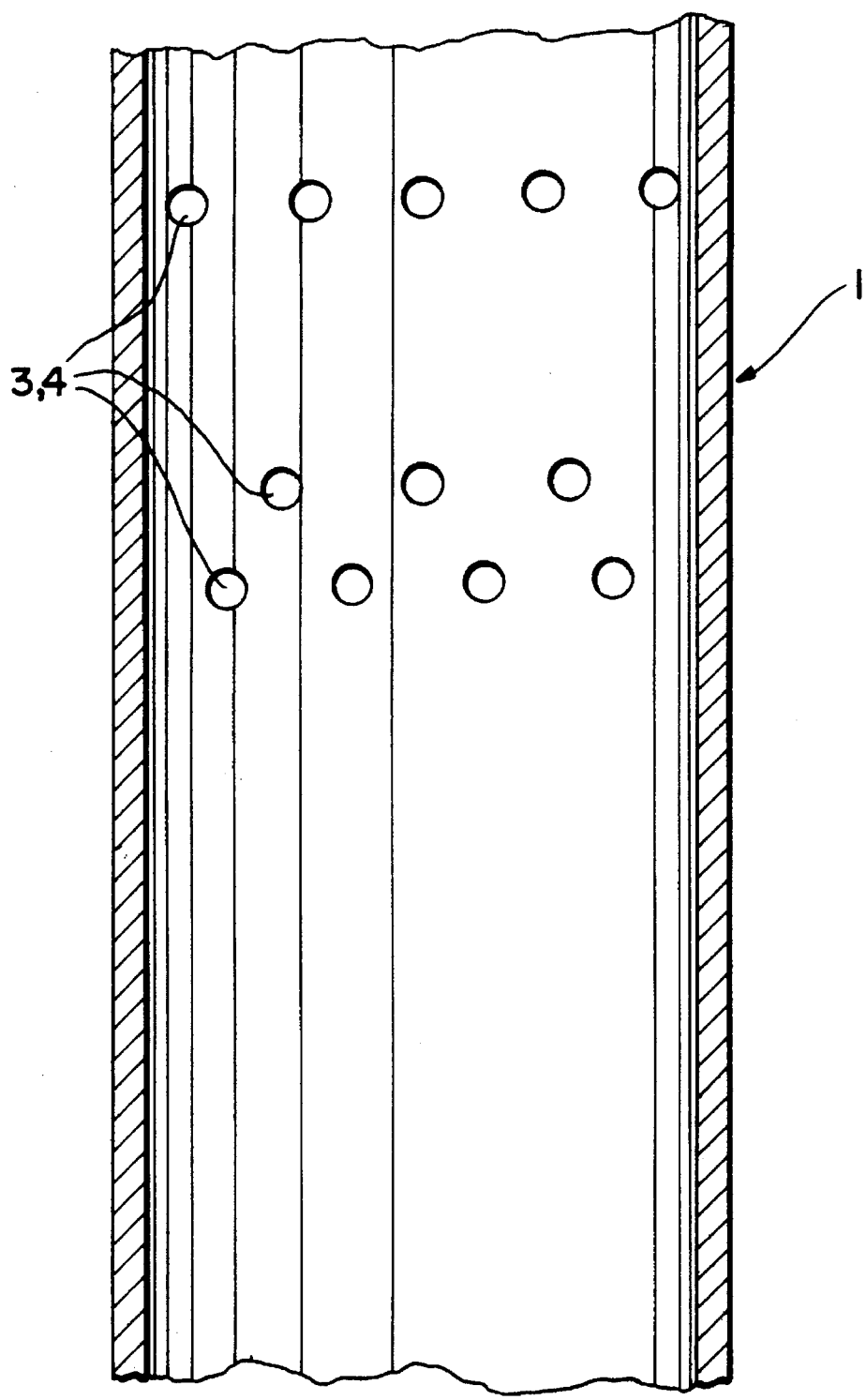
FIG. 2 shows an axial longitudinal section through the flue gas passage of the boiler.
Figure 3:
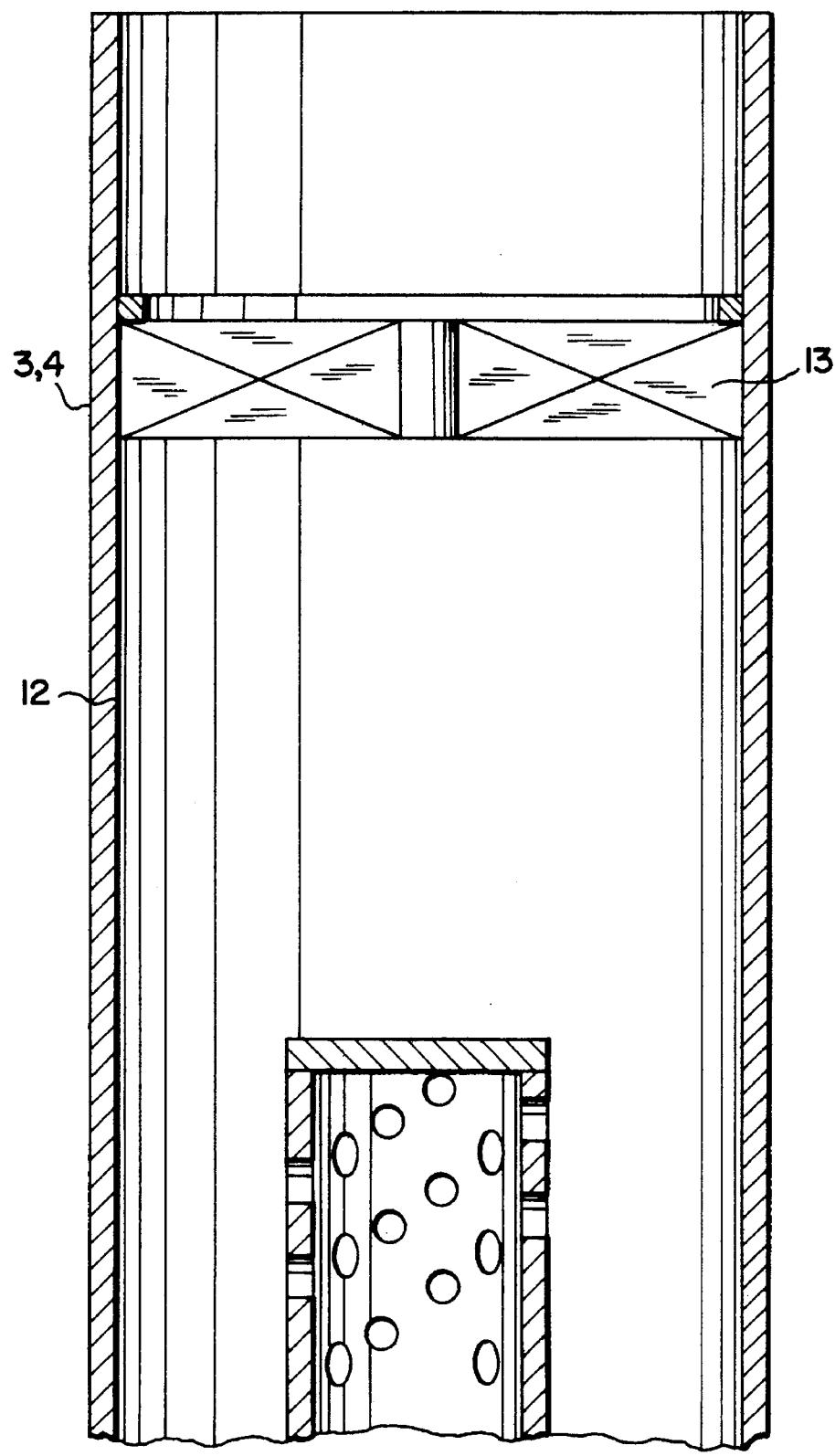
FIG. 3 shows the diagrammatic structure of an angular momentum nozzle.
Figure 4A:
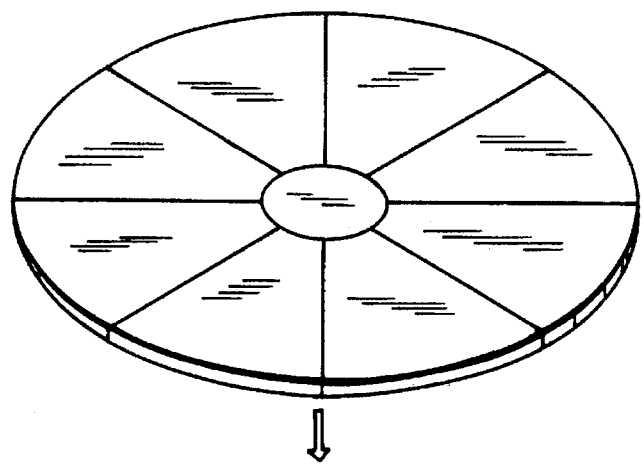
FIGS. 4a–c show an axial vane grid (swirl plate;) for producing the angular momentum
Figure 4B:
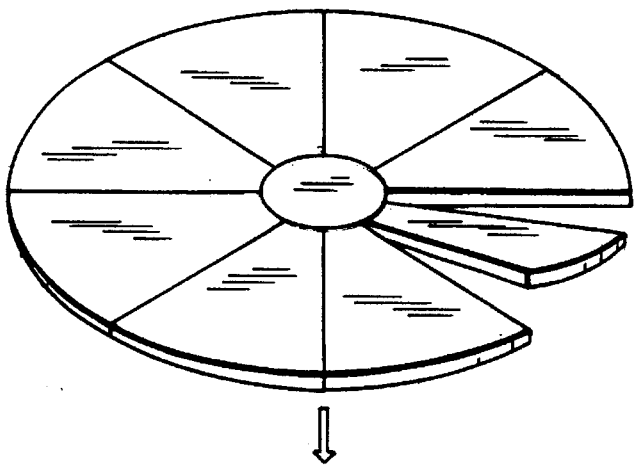
Figure 4C:
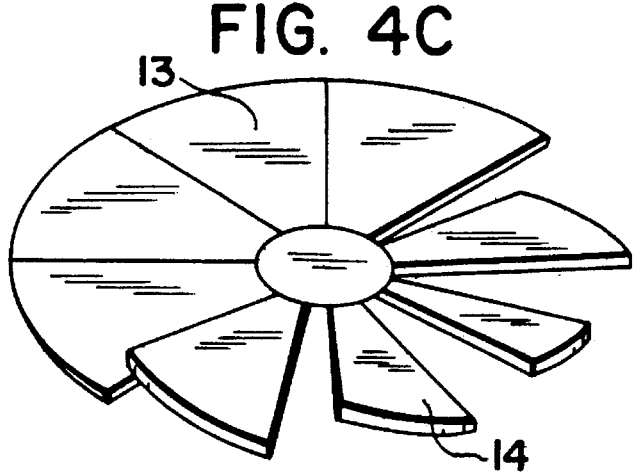

The boiler 1 has a melting chamber furnace with progressive combustion, i.e. with main burners 2 and angular momentum nozzles 3 arranged above as supplementary burners. The main burners are supplied with air by way of a manifold 5 and the secondary air nozzles 4, likewise formed as angular momentum nozzles, by way of individual lines 6. A flue gas passage 8 starts from the second draw 7 of the boiler through which the flue gas reaches the stack. From the flue gas passage 8, by way of a flue gas blower 10, flue gas is returned through a flue gas line 9 to the supplementary burners 3 to strengthen the impulse of hydrocarbon supplied via a line 11. The angular momentum nozzles—supplementary burners 3 and secondary air nozzles 4—are, as can be seen in FIG. 2, distributed around the periphery of the flue gas passage and can be arranged in several planes extending at right angles to the axis of the passage.

The nozzles 3 and 4 comprise a pipe 12 in which an axial vane grid (swirl plate) 13 is installed. If, as in the case of the supplementary burners 3, two media—here returned exhaust gas and a hydrocarbon, e.g. natural gas, are to be injected, the two media are mixed before the swirl plate and the entire mass flow is swirled. Should pre-mixing not be possible for operational reasons the larger mass flow should be swirled or the swirling should be realised without fittings, e.g. by tangential flow into the nozzles.

The swirl plate 13 can comprise a simple disc in which several cuts, for example 8 to 10, are made from the edge to near the centre. The segments 14 thus formed are bent upwards until the desired vane angle is obtained.

Figure 5A:
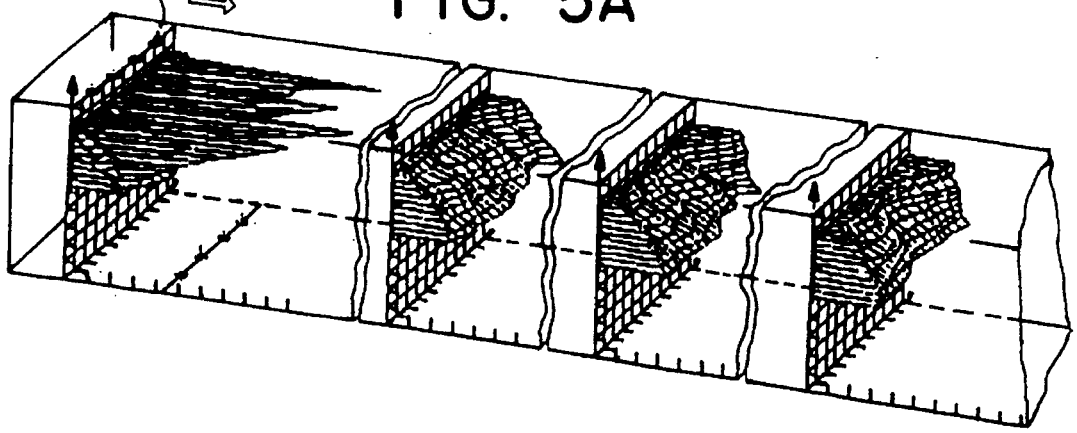
FIGS. 5a–b shows the measured concentration distribution of the auxiliary stream medium in the main stream.
Figure 5B:
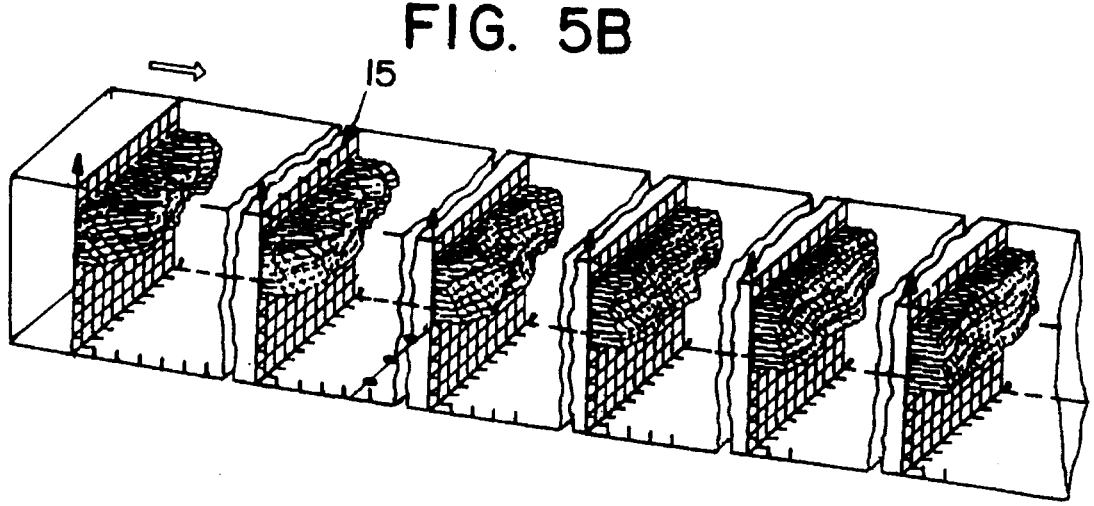

FIG. 5 shows the measured concentration distribution of the auxiliary stream medium in the main stream. The upper half of the drawing characterises the typical course of mixing a reducing medium which is blown into the main stream at the discharge point 15 by means of injector nozzle. The bottom half of the drawing characterises the course of the mixing which occurs when using the process according to the invention and the angular momentum nozzles and in which the gas stream is already relatively homogeneous over its cross-section upstream from the discharge point.

What is claimed is:

1. A process for reducing nitrogen oxides contained in flue gases of furnace installations, comprising the steps of:

returning a partial flow of the flue gases;

mixing the partial flow of the flue gases with hydrocarbons as reduction agents so as to increase the impulse of the reduction agents;

providing the partial flow with an angular momentum having a theoretical swirl number (a ratio of the swirl-momentum flow, normalized with the nozzle radius, to the axial impulse flow) of from 0.4 to 0.5, which ensures after injection, an intensive mixing with a flue gas flow; and injecting the partial flow counter to the flue gas flow at an angle of 10° to 80°.

2. A process according to claim 1, wherein the injecting step includes injecting the partial flow at an injection angle having a theoretical angle number (a ratio of angular momentum flow, normalized with the nozzle radius, to axial impulse flow) that is from 0.4 to 5 times a critical angle number.

3. A process according to claim 1 wherein several sub-streams of auxiliary gas are injected into the main gas stream.

4. A process according to claim 3 wherein the sub-streams are injected into the main stream with different directions of flow.

5. A process according to claim 3 wherein the directions of at least some of the streams run counter to one another.

6. A process according to claim 3 wherein the sub-streams are injected in at least one plane.

7. A process according to claim 1 wherein the auxiliary gas stream is injected at an elevated temperature.

8. A process according to claim 7 wherein the mass flow ratio is adjustable.

9. A process according to claim 1 wherein the flue gas flow and the partial gas flow, per nozzle, have a mass flow ratio from 20 to 120.

10. A process according to claim 1 wherein a ratio of main gas flow to auxiliary gas flow per nozzle forms a momentum stream ratio of from 1 to 10.

11. A process according to claim 1 wherein a momentum stream ratio of main gas flow to auxiliary gas flow per nozzle is adjustable.

12. A process according to claim 1 wherein the mixing ratio of hydrocarbon to flue gas is from 1:5 to 1:40.

13. A process according to claim 1 wherein the mixing ratio of hydrocarbon to flue gas is adjustable.

14. A process according to claim 1 wherein at least one of the main gas temperature and the auxiliary gas temperature is within the respective ranges of from 300° C. to 1200° C. for the main gas temperature and from 100° C. to 400° C. for the auxiliary gas temperature.

15. A device for reducing nitrogen oxides contained in flue gases of furnace installations, comprising:

means for returning a partial flow of the flue gases;

means for mixing the partial flow of the flue gases with hydrocarbons as reduction agents; and nozzle means for providing the partial flow with an angular momentum, said nozzle means including swirl plates for injecting the partial flow counter to a flue gas flow at an injection angle of 10° to 80°.

16. A nozzle according to claim 15 wherein the swirl plates comprise axial vanes inclined at an angle of from 10° to 80° to a longitudinal axis of a pipe of the nozzle means.

17. A device for reducing nitrogen oxides contained in flue gases of furnace installations, comprising:

means for returning a partial flow of the flue gases;

means for mixing the partial flow of the flue gases with hydrocarbons as reduction agents; and nozzle means for providing the partial flow with an angular momentum and for injecting the partial flow counter to the flue gas flow at an injection angle of 10° to 80°, said nozzle means including a plurality of nozzles distributed around the periphery of a flue gas passage.

18. A device according to claim 17 wherein the nozzles are arranged in different planes extending at right angles to the axis of the passage.

19. A device according to claim 17 wherein at least some of the nozzles are at different angles counter to the direction of the main stream.

* * * * *